March 5, 1957
C. W. MUNDAY
2,784,335
INFRA-RED RADIATION SOURCE
Filed Jan. 27, 1954
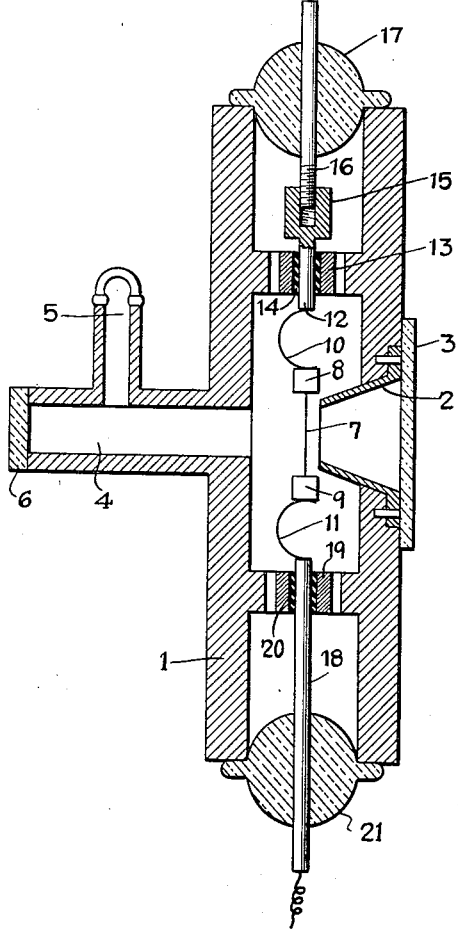
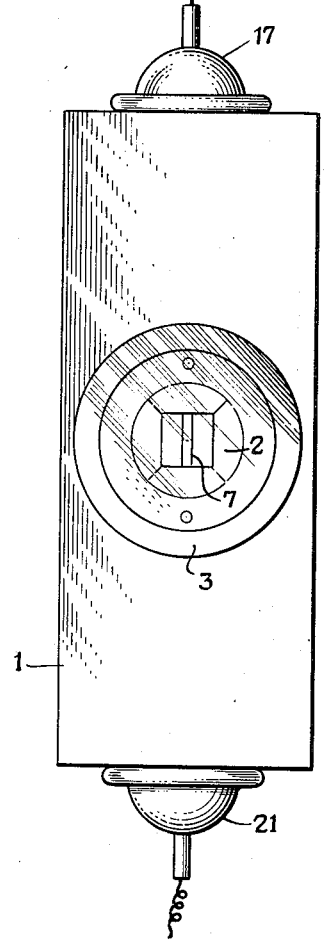
INVENTOR.
CHARLES WALTER MUNDAY.
BY Ward, Neal, Haselton,
Orme & McElhannon
ATTORNEYS.

United States Patent Office 2,784,335
Patented Mar. 5, 1957

2,784,335

INFRA-RED RADIATION SOURCE

Charles Walter Munday, London, England, assignor to The Distillers Company Limited, Edinburgh, Scotland, a British company Application January 27, 1954, Serial No. 406,475

Claims priority, application Great Britain February 4, 1953

11 Claims. (Cl. 313—112)

The present invention relates to an improved source of radiation.

It is an object of the present invention to provide a source of radiation which possesses thermal symmetry, wherein there is no change in radiation intensity with small temperature variations and wherein the radiation emanates solely from the source and not from the surroundings of the source.

Accordingly, the present invention is for a radiation source which comprises a metal chamber provided with an opening with attached funnel and means for evacuating said metal chamber, a metal strip supported at both ends within said metal chamber, electrical connections at each end of the metal strip, the metal strip adapted to emit radiation when an electrical current is passed therethrough, the metal strip and funnel being arranged so that the extremity of the funnel adjacent to the strip coincides with the portion of the strip at operating temperatures, which it is desired to use.

The opening in the chamber wall and the funnel may be of any suitable cross-section, such as rectangular, circular, etc. It has been found advantageous for the funnel extremity or aperture adjacent to the strip to be rectangular or square. The funnel attached to the opening converges on the strip and it has been found suitable for the dimension of the funnel extremity to correspond to the length of the strip, although it is not necessary that this should be the case. The effective size of the source can be simply varied by changing the funnel attachment of the chamber.

The metal strip is suitably supported by means which apply tension to the length thereof, such as springs, so that the strip can be maintained fully extended despite variations in the length thereof with temperature. It is desirable also to provide means, such as screws, for the adjustment of the tension of the strip. Electrical connections may be made to said metal strip in any suitable way. For maximum beam balance stability, thermal symmetry about the optical axis of the instrument is essential.

The metal chamber may be made of any metal and is suitably made of a metal of high thermal conductivity such as copper or brass. In order to facilitate the measurement of the temperature of the strip, it is desirable to provide a window at the rear of the chamber in line with the strip and the aperture. If such a window is provided, the temperature of the strip may be simply measured by comparison in the standard way with a black body of known temperature.

The window enclosing the opening of said chamber, and also the window at the rear of the chamber, may be constructed of any material transparent to infra-red radiation at the wave-lengths to be employed. Suitable materials include for example glass, quartz and sapphire.

In order to avoid any temperature variation across the strip as caused by convection currents, the chamber containing the strip should be evacuated. For this purpose the various unions in the apparatus, such as the joint of the window to the chamber, should be vacuum sealed. This may be achieved for example by making the joints with any suitable thermosetting resin.

It is desirable to minimise as far as possible any heating of the funnel and, therefore, this should be made of a thermally conducting material, such as copper or brass, and the interior and exterior of the funnel should be polished in order to reflect radiation falling thereon. The interior of the chamber should be black, that is the surface absorbs radiations of all wavelengths. Further, this chamber should have high thermal conductivity and a thermal ground.

For an infra-red radiation source the metal strip forming the infra-red element may be constructed of any metal capable of emanating infra-red rays when heated to an appropriate temperature, and may comprise, for example Nichrome or tantalum strip.

By way of illustration a source of radiation is shown in the accompanying drawings.

Figure 1 is a side cross-sectional view of a radiation source. Figure 2 is a front elevational view of the radiation source of Figure 1.

In Figure 1, the radiation source comprises the chamber 1 constructed of brass provided with an opening in which is mounted the funnel 2, and which is sealed by the window 3. The chamber is provided with gas withdrawal means 4 and tube 5. A window 6 is provided at the end of the tube 4 for the measurement of the temperature of the strip. The metal strip 7 is carried by members 8 and 9 which are supported and tensioned by springs 10 and 11. The spring 10 is connected to the conducting bar 12 carrying the rectangular member 13 from which it is insulated by insulation 14. The bar 12 terminates in the female screw head 15 into which the screw 16 fits. The screw 16 is surrounded by the glass bulb 17 which is sealed to the opening of the chamber. Rotation of the member 16 causes screw 16 to screw in or out of the screw head 15 thus increasing or decreasing the tension on the strip 7. The rectangular member 13 fits slidably into a constriction of rectangular cross-section thus preventing rotation of the strip 7. The spring 11 is connected to bar 18 carrying the rectangular member 19 from which it is insulated by insulation 20, this member also fitting slidably into a constriction of rectangular cross-section and the end portion of the bar 18 is surmounted by the glass bulb 21 which is sealed to the opening of the chamber. The larger opening of the funnel 2 which fits into the opening of the chamber is of circular cross-section, and the smaller opening or aperture of the funnel is of square cross-section.

I claim:

1. A radiation source which comprises a metal walled chamber provided with an opening in the wall thereof enclosed by a window, a funnel mounted in said opening, said funnel having a radiation passageway therethrough surrounded by an opaque wall, means for evacuating said chamber, a metal strip supported at both ends within said chamber, electrical connections at each end of the metal strip, said strip being adapted to emit radiation when an electrical current is passed therethrough, the metal strip and the funnel being so arranged that one extremity of said passageway is adjacent to the strip and coincides with the portion of the strip at operating temperatures which it is desired to use.

2. A radiation source as claimed in claim 1 wherein the cross-section of said extremity of said passageway adjacent to the strip is rectangular.

3. A radiation source as claimed in claim 1 wherein the cross-section of said extremity of said passageway adjacent to the strip is square.

4. A radiation source as claimed in claim 1 wherein the chamber is constructed of a metal selected from the group consisting of copper and brass.

5. A radiation source as claimed in claim 1 wherein the window is constructed of a material selected from the group consisting of glass, quartz or sapphire.

6. A radiation source as claimed in claim 1 wherein the funnel is constructed of a metal selected from the group consisting of copper and brass.

7. A radiation source as claimed in claim 1 wherein the metal strip is a Nichrome strip.

8. A radiation source as claimed in claim 1 wherein the metal strip is a tantalum strip.

9. A radiation source which comprises a metal walled chamber provided with an opening the wall thereof enclosed by a window, a funnel mounted in said opening, said funnel having a radiation passageway therethrough surrounded by an opaque wall means for evacuating said chamber, a metal strip supported at both ends within said chamber by means which apply tension to the length of said strip, said strip being partly surrounded by said wall of said chamber, electrical connections at each end of the metal strip, the metal strip being adapted to emit radiation when an electrical current is passed therethrough, the metal strip and the funnel being arranged so that one extremity of said passageway is adjacent to the strip and coincides with the portion of the strip at operating temperatures which it is desired to use.

10. A radiation source as claimed in claim 1 wherein the interior surface of the wall of said chamber is adapted to absorb substantially all of the radiation from said strip falling on said surface.

11. A radiation source comprising a metal walled chamber provided with an opening in the wall thereof enclosed by a window, a funnel mounted in said opening, said funnel having a radiation passageway therethrough surrounded by an opaque wall, a radiation emitter mounted in said chamber, the space around said emitter being evacuated and said emitter being substantially surrounded by said wall of said chamber, and said funnel being mounted with one extremity of said passageway adjacent said emitter and with the other extremity of said passageway adjacent said window.

References Cited in the file of this patent
UNITED STATES PATENTS
2,516,132    Marcouiller _____ July 25, 1950